United States Patent
Thomas et al.

(10) Patent No.: US 9,077,183 B2
(45) Date of Patent: Jul. 7, 2015

(54) DISTRIBUTED LOW-POWER WIRELESS MONITORING

(71) Applicants: The State of Oregon acting by and through the State Board of Higher Education on Behalf of the Portland State University, Portland, OR (US); Stevens Water Monitoring Systems, Inc., Portland, OR (US)

(72) Inventors: Evan A. Thomas, Portland, OR (US); Michael E. Fleming, Vancouver, WA (US); William K Spiller, Vancouver, WA (US); Chun Kit Chan, Clackamas, OR (US); Zdenek Zumr, Portland, OR (US)

(73) Assignees: Portland State University, Portland, OR (US); Stevens Water Monitoring Systems, Inc., Portland, OR (US)

( * ) Notice: Subject to any disclaimer, the term of this patent is extended or adjusted under 35 U.S.C. 154(b) by 127 days.

(21) Appl. No.: 13/959,347

(22) Filed: Aug. 5, 2013

(65) Prior Publication Data

US 2013/0317659 A1    Nov. 28, 2013

Related U.S. Application Data

(63) Continuation-in-part of application No. 13/605,828, filed on Sep. 6, 2012, now abandoned.

(60) Provisional application No. 61/531,579, filed on Sep. 6, 2011.

(51) Int. Cl.
    *G08C 17/00*    (2006.01)
    *H02J 4/00*    (2006.01)
    *H04W 52/02*    (2009.01)

(52) U.S. Cl.
    CPC ............. *H02J 4/00* (2013.01); *H04W 52/0216* (2013.01); *Y02B 60/50* (2013.01); *H04W 52/0219* (2013.01)

(58) Field of Classification Search
    CPC ...................................................... H04W 4/005
    See application file for complete search history.

(56) References Cited

U.S. PATENT DOCUMENTS

| | | | |
|---|---|---|---|
| 5,790,977 A | 8/1998 | Ezekiel | |
| 6,208,247 B1 | 3/2001 | Agre | |
| 6,735,630 B1 | 5/2004 | Gelvin et al. | |
| 7,342,506 B2 | 3/2008 | Higgins et al. | |
| 7,360,413 B2 | 4/2008 | Jeffries et al. | |
| 2002/0078173 A1 | 6/2002 | Horn et al. | |
| 2006/0176169 A1 | 8/2006 | Doolin et al. | |
| 2009/0058663 A1 | 3/2009 | Joshi et al. | |
| 2009/0076343 A1 | 3/2009 | James et al. | |
| 2009/0287456 A1 | 11/2009 | King et al. | |
| 2010/0106269 A1 | 4/2010 | Garudadri et al. | |
| 2011/0035063 A1* | 2/2011 | Palayur | 700/283 |
| 2011/0074596 A1 | 3/2011 | Frohlick et al. | |
| 2011/0111700 A1* | 5/2011 | Hackett | 455/41.2 |
| 2013/0093592 A1 | 4/2013 | Lan et al. | |
| 2013/0328697 A1 | 12/2013 | Lundy | |

\* cited by examiner

*Primary Examiner* — Maharishi Khirodhar
(74) *Attorney, Agent, or Firm* — Lumen Patent Firm (57) ABSTRACT

A distributed wireless monitoring system with a cloud server and low-power remote sensors includes data encoding/compression at sensors to reduce power use from transmission and storage, event activated operation/data logging triggered by configurable thresholds, remote configuration via the cloud server of event triggering thresholds and correlation templates, distributed processing capabilities, and sensor clock synchronization from a network time service.

8 Claims, 8 Drawing Sheets

DISTRIBUTED LOW-POWER WIRELESS MONITORING

CROSS-REFERENCE TO RELATED APPLICATIONS

This application is a continuation-in-part of U.S. patent application Ser. No. 13/605,828 filed Sep. 6, 2012, which claims priority from U.S. Provisional Patent Application 61/531,579 filed Sep. 6, 2011, both of which are incorporated herein by reference.

FIELD OF THE INVENTION

The present invention relates generally to wireless monitoring systems. More specifically, it relates to methods for distributed low-power wireless monitoring.

BACKGROUND OF THE INVENTION

Distributed wireless monitoring systems have many important applications including deployment in third-world communities that currently lack access to safe drinking water and/or use biomass for their daily energy needs. Remote monitoring systems are a useful method to ensure the success of water, energy and infrastructure projects conducted in their communities. Rather than infrequent human measurement, remote monitoring systems deployed in these communities automatically make measurements and ensure that community partnerships are maintained.

Current distributed wireless monitoring systems typically take one of four approaches to data logging. In one approach, sensor data is logged at specific scheduled times or intervals (e.g., every 15 minutes). Another approach logs a data point whenever a monitored cumulative usage meets a predetermined value (e.g., upon each gallon of water flow past the sensor). Other approaches detect a discrete change in state, and the logger records a timestamp or duration since the last change in state. In another approach, the data logger is a counter that simply logs a total number of discrete events.

Current distributed wireless monitoring systems experience a tradeoff between frequency of sampling/logging and energy consumption. On the one hand, in many applications it is beneficial to have plentiful data reported at frequent intervals. On the other hand, data sampling, logging, and wireless transmission all consume power which is limited in battery operated remote sensor devices. Unfortunately, current systems use remote sensor devices that are not power efficient because they are built of components (sensors, microprocessor, logger, radio, antenna, and power supply) that are packaged and sold separately. In view of these and other problems with existing distributed wireless monitoring systems, it would be an advance in the art to provide improved distributed wireless monitoring systems that address these problems.

SUMMARY OF THE INVENTION

In one aspect, the invention provides a system and method for distributed wireless monitoring with low-power remote sensor devices, referred to as data acquisition platforms (DAPs). The system is flexible and reconfigurable using instructions and configuration settings that may be remotely relayed to the DAPs during operation.

In contrast with conventional pulse, state or event logging methods, the data acquisition method used in embodiments of the present invention logs events based on a comparison of a current sensed value with a past sensed value or baseline value and a configurable parameter. A comparator compares signal samples from sensors and compares a current value to a preceding sampled value to produce a difference. If the difference is more than a remotely programmable threshold, the parameter difference and timestamp is logged. Logging then continues until the parameter returns to a second configurable threshold, at which time logging stops and the DAP enters a low-power mode. In other words, the data logger is activated based on predetermined differences between two sensed values. Power consumption is also reduced by data compression, reducing the duration of wireless transmission. The DAP is a fully integrated hardware device that includes the front-end sensor(s), the processing hardware, the radio and the power supply, all packaged together and managed in a way that minimizes power consumption.

The invention thus provides a compact, power-efficient, programmable data acquisition instrument that has long duration operation with high resolution data logging while operating on AA size batteries. Customized and remotely updatable thresholds customize triggers for event logging. Compressed data is periodically uploaded to an internet cloud server which performs more power-hungry data analysis using cloud-based software programs. The internet-cloud server is accessible through any standard internet browser.

There are several key features of both DAP and the cloud-based software programs that combine as one complete data acquisition system to enable high performance and advanced data analysis.

In one aspect, the invention provides a method implemented by a remote data acquisition platform (DAP) in a distributed wireless monitoring system. According to the method, the DAP receives over a wireless internet link from a cloud server a difference threshold for event triggering, a sampling interval, a sensor baseline value, a reporting schedule, sensor calibration information, and current time and date information. The DAP samples by comparators at the sampling interval a sensor value, activates a data logger if the comparators sense a differential change in the sensor value exceeding the difference threshold for event triggering, and logs the sensor value together with a timestamp as stored data while the data logger is activated. The DAP deactivates the data logger and enters a sleep mode if the sensor value returns to the sensor baseline. The DAP also compression encodes the stored data, and transmits the compression encoded stored data over the wireless internet link to the cloud server according to the reporting schedule. The DAP may also receive over the wireless internet link from the cloud server a device control parameter, and sends a control signal to a device actuator based on the received device control parameter.

The method may also include transmitting the compression encoded stored data if a predetermined threshold of data has been logged, or may include transmitting an alarm if a low battery capacity state is detected, if a sensor value exceeds a predefined threshold, or if a predefined comparator difference is exceeded. The method may include deactivating the data logger and entering a sleep mode if communications over the wireless internet link to the cloud server is disrupted and more than three connection attempts fail. The method may include dynamically downloading over the wireless internet link from the cloud server application code, executing the application code, and uploading over the wireless internet link to the cloud server results of the executing, wherein the application code is a component of a separable program for distributed processing.

The method may include performing data analysis of sensor values prior to data being transmitted to the cloud server.

In some embodiments, the method may include performing signal processing of sensor values prior to logging sensor values, wherein the signal processing is selected from the group consisting of performing numerical derivatives, low pass filtering, frequency domain adaptive filtering, and time averaging. The method may include simultaneously sampling and logging multiple sensor values representative of multiple distinct physical parameters selected from the group consisting of weather, air quality, water level, water flow, water quality, fluid pressure, vibration, image, electric current, solar irradiance, soil moisture.

DETAILED DESCRIPTION

Figure 1:
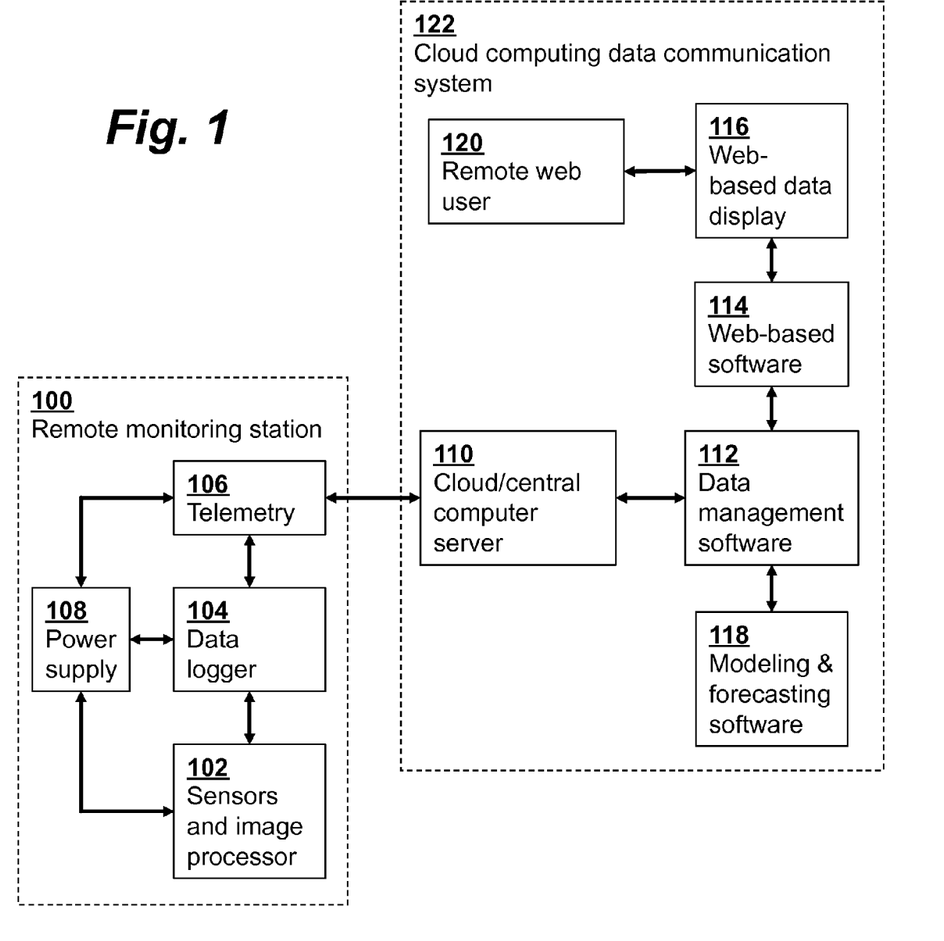
FIG. 1 is a block diagram of a wireless monitoring data communication system architecture according to an embodiment of the invention.

An embodiment of a distributed wireless monitoring system according to the invention is shown in FIG. 1. The system includes a cloud computing data communication system 122 which includes a computer server 110 in communication with multiple distributed remote monitoring devices, such as station 100. The remote station 100 includes sensors 102 (which may include an image processor) a data logger 104, telemetry 106, and power supply 108. Measurements using sensors 102 are encoded using data compression in order to reduce power consumption from transmission and storage. The compact data representation is decoded by the cloud server 110 after upload. The sensors 102 and data logger 104 are event activated based on predetermined comparison thresholds between one or several independent sensors, resulting in added power conservation. The event triggering thresholds may be remotely configured via the cloud server 110. The remote station 100 also may be configured to provide alarm condition notifications. The distributed remote stations have internal clocks that are synchronized with a network time service. The smart-sensor data acquisition platform technology provides a low power profile, while maintaining high resolution data logging capabilities.

The cloud computing system 122 includes data management software 112 which stores, organizes, and analyzes incoming data from the multiple remote monitoring stations. Modeling and forecasting software 118 may provide supplemental data analysis. The results of the data analysis, as well as the data itself, is accessed by web-based software 114 and used to generate web-based display of the data 116 which is viewable over the web by a remote web user 120.

Figure 2:
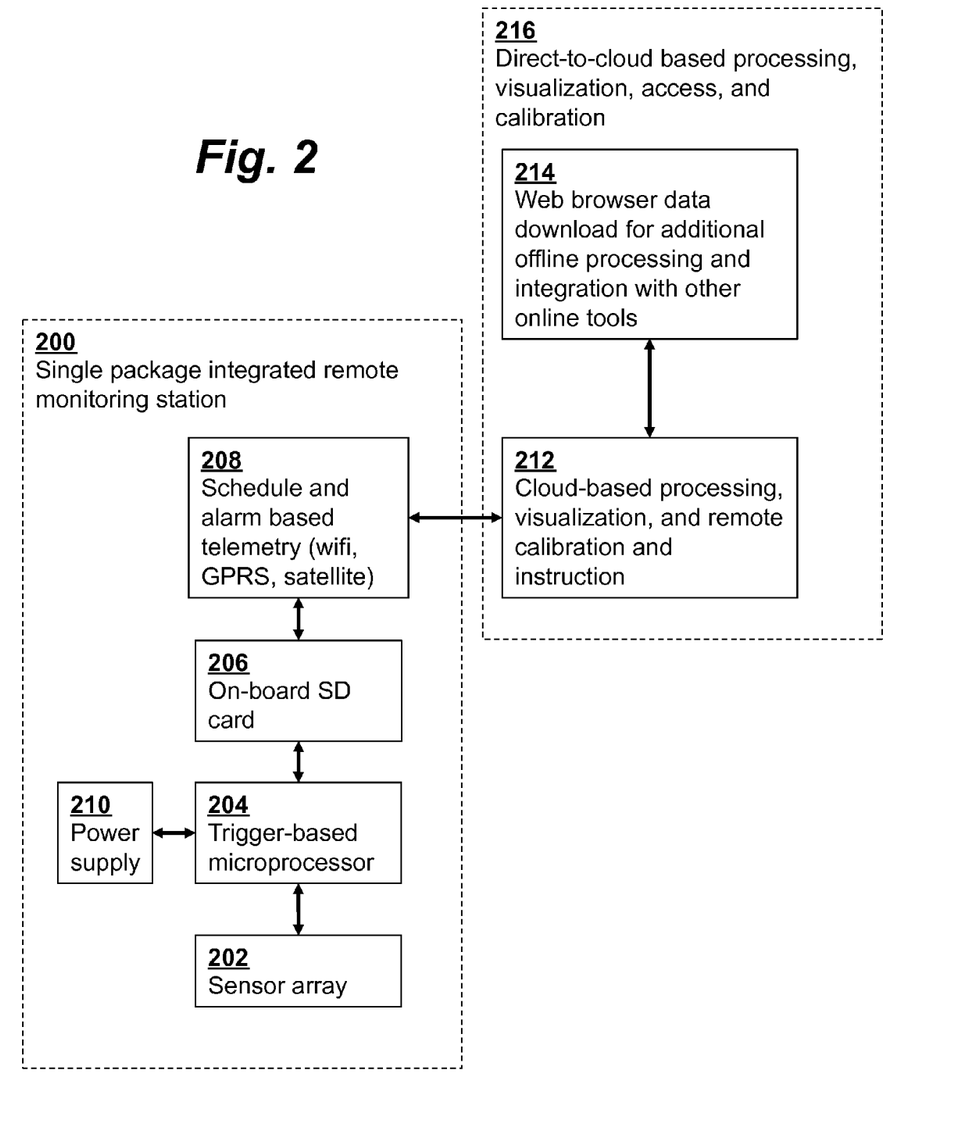
FIG. 2 is a block diagram illustrating a wireless monitoring system architecture according to an embodiment of the invention.

An alternate embodiment of a system implementing the techniques of the present invention is shown in FIG. 2. The system includes multiple remote monitoring stations such as station 200 which is realized as a single package integrated data acquisition platform including an array of sensors 202, trigger-based microprocessor 204, on-board secure digital (SD) memory card 206, schedule and alarm-based telemetry interface (e.g., using Wi-Fi, GPRS, and/or satellite communication link), and power supply 210 (e.g., on-board battery). The SD memory card contained on the sensor board can log data locally for periodic manual retrieval, providing data integrity and backup. Every data transmission, successful or not, is locally stored by the card 206 for periodic manual retrieval. Data collected and logged is compressed and transmitted by telemetry interface 208 to cloud-based server 212 that performs processing, visualization, and remote calibration and instruction. A web server interface 214 provides remote web users with access to raw and/or processed sensor data, e.g., allowing a user to download data for offline processing and/or integration with other online tools.

Figure 4:
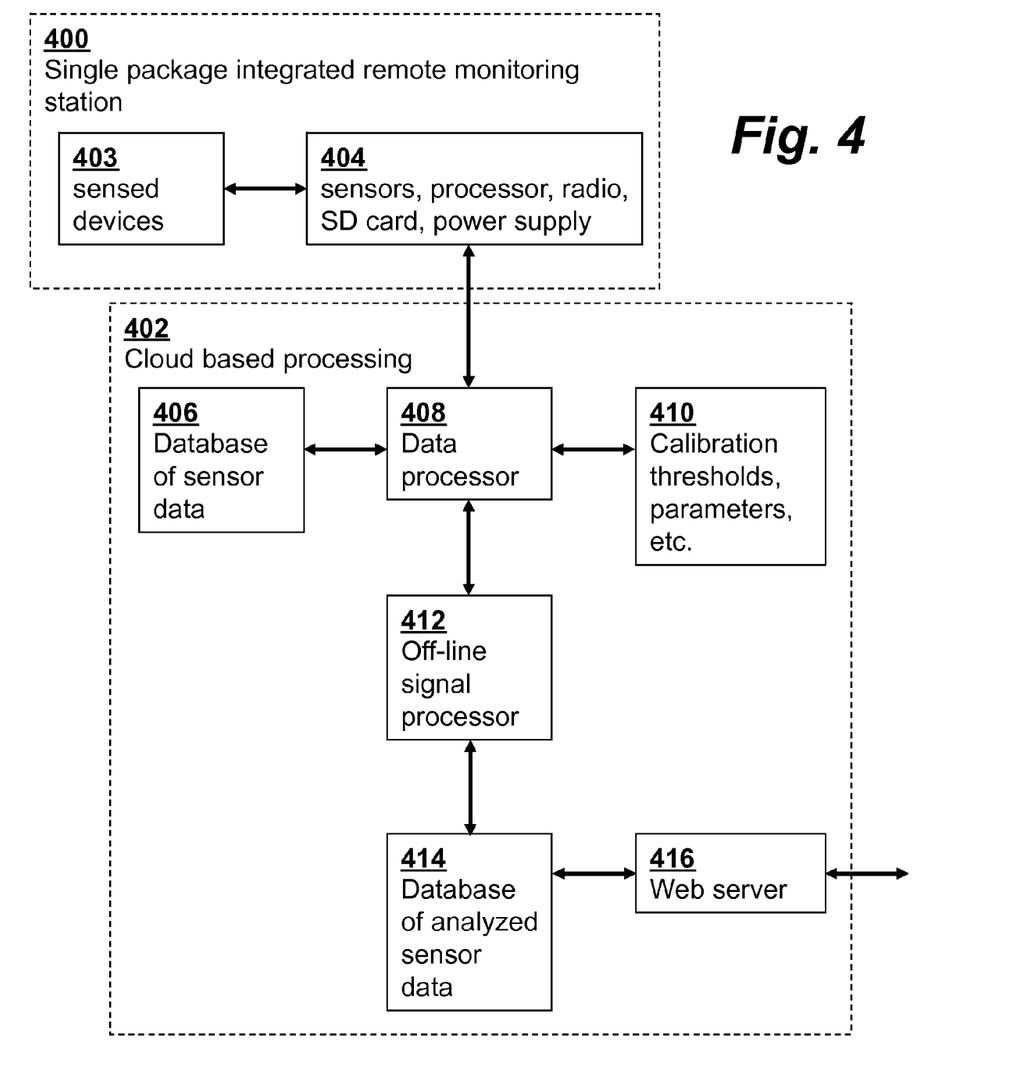
FIG. 4 is a block diagram illustrating a wireless monitoring system architecture according to an embodiment of the invention.

FIG. 4 provides a block diagram illustrating another architecture that may be used to implement the techniques of the present invention. Remote monitoring stations such as station 400 are connected wirelessly to a cloud-based processing platform 402. The station 400 is realized as a single package integrated data acquisition platform including sensors, processor, radio, SD card and power supply 404 connected to sensed devices 403. Logged data is periodically uploaded to cloud-based processing system 402 which includes data processor 408 connected to a database of sensor data 406, memory storing calibration thresholds and other parameters 410. Off-line signal processor 412 performs high-level analysis of the raw data 406 and stores results in a database of analyzed sensor data 414. A web server 416 provides remote web users with access to the analyzed sensor data 414.

Figure 3:
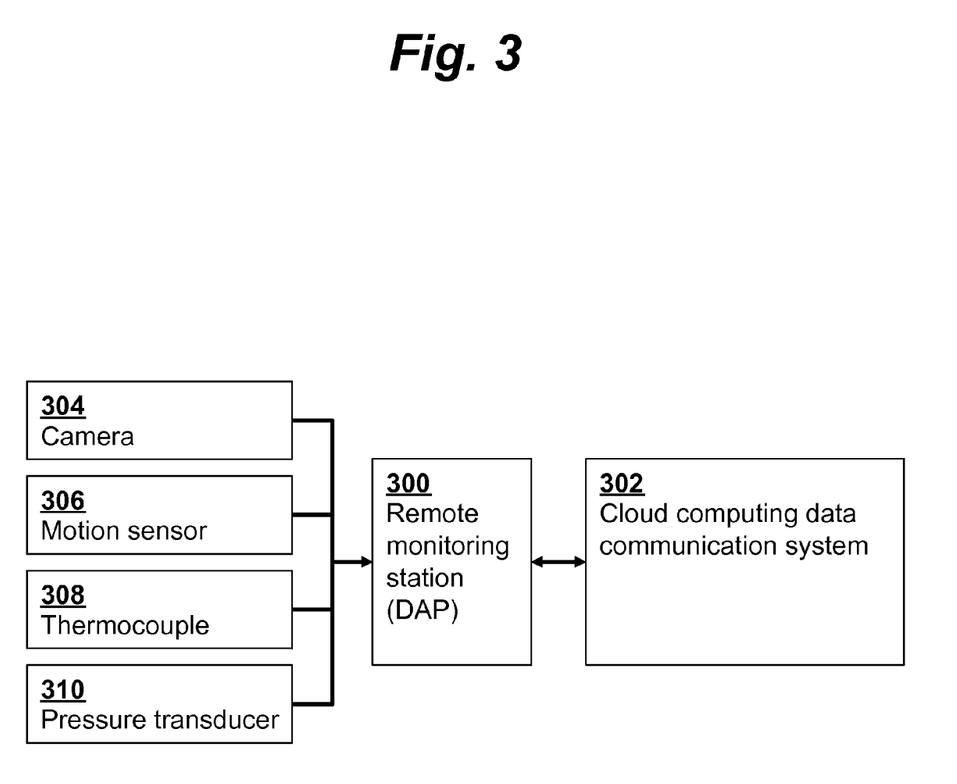
FIG. 3 is a block diagram of a wireless monitoring system illustrating various sensor types connecting to DAP hardware in communication with a cloud-based computing system, according to an embodiment of the invention.

FIG. 3 is a schematic block diagram illustrating examples of different types of sensors that may be simultaneously connected to a remote monitoring station 300 for monitoring. In this example, the station 300 is connected to a camera 304, motion sensor 306, thermocouple 308, and pressure transducer 310. Measurements from these sensors are then periodically uploaded to cloud computing data communication system 302 for centralized storage and analysis together with data uploaded from other remote stations in the distributed network. The capability of station 300 to simultaneously connect to different sensor types provides diverse applications, such as sensing status of biogas generators, footbridges, water treatment systems, sanitation, energy, infrastructure, machine performance, security, etc. using any of various commercially available sensors selected to provide key data parameters on performance and usage of target technologies. These sensors may be pressure transducers, liquid and/or gas pressure and/or flow rate sensors, switches, gas emissions sensors (e.g., CO, CO2, particulate matter), vibration and/or motion sensors, cameras, water quality sensors (e.g., pH, conductivity), electrical current sensors, energy use sensors, soil moisture sensors, water level sensors, environmental condition sensors (e.g., temperature sensors, humidity sensors, solar irradiance, wind), and alarm condition monitoring. These sensors may indicate usage frequency and performance in situ and directly integrate with the control board that samples the sensors periodically, detects trigger events, logs usage events, and relays consolidated data files to the Internet cloud.

Figure 5:
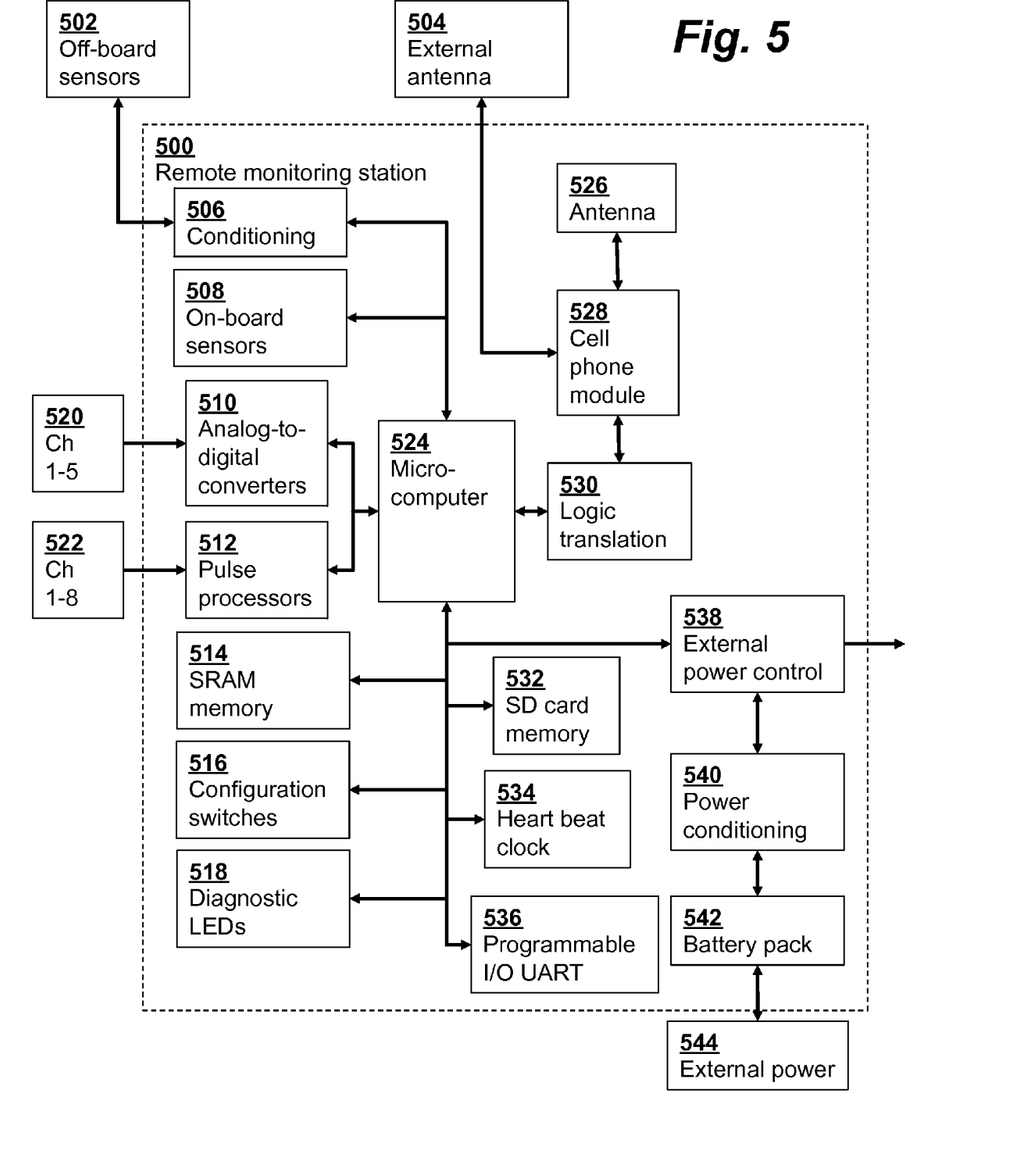
FIG. 5 is a block diagram illustrating components of a data acquisition platform, according to an embodiment of the invention.

FIG. 5 is a block diagram illustrating components of a remote monitoring station 500, also referred to as a data acquisition platform (DAP) implemented as a single circuit board. External off-board sensors such as sensor 502 connect to a conditioning circuit 506 on the board. The board also includes on-board sensors 508 which may include any of various commercially available front-end sensors suitable for the target application. These sensors can be any number of a variety of available sensors, including differential pressure transducers, a motion detector, a camera, thermocouples, gas emissions sensors (e.g., CO/CO2), and water quality sensors.

Analog-to-digital converters (ADCs) 510 and pulse processing circuits 512 accept external analog sensor inputs 520 and sensor pulse inputs 522, respectively, allowing the unit to be customized through connection with various specialized sensors. A microcomputer 524 processes the measured sensor signals from conditioning circuit 506, on-board sensors 508, ADCs 510, and pulse processors 512. The raw sensor measurements are temporarily stored in static random access memory (SRAM) 514 for use in the short term, and in SD card memory 532 for long-term archiving.

The board 500 also includes manual configuration switches 516, diagnostic light emitting diode (LED) indicators 518, and a programmable universal asynchronous receiver/transmitter (UART) for local serial input/output (I/O). The board 500 has a clock 534 which is periodically synchronized with an external time service, e.g., when the board communicates with the cloud server over the internet or communicates with a wireless access point or cell tower. At appropriate times, the board 500 initiates a wireless link using a cell phone module and internal antenna 526 or external antenna 504. A logic translation circuit 530 interfaces with the cell phone module 528. A battery pack 542 provides the board with sufficient power for long term autonomous operation. Battery pack 542 may be charged with a connection to an external power source 544. Power conditioning circuit 540 interfaces the battery pack with the power control circuit 538 which has a capability for connection to an external power source.

During installation, the DAP 500 and connected sensors are powered, and then the DAP relays data (e.g., sensor measurements, operational usage and performance data) directly to the cloud-based software programs via periodic wireless uploads.

In one embodiment, the cell phone module 528 is a general packet radio service (GPRS) module connected to a subscriber identity module (SIM) card. The board's capability for direct wireless internet access avoids the need for deploying an intermediate base station to relay sensor data to the internet. The GPRS module obtains a data link to a cellular network tower periodically to relay the sensor data directly to the internet cloud server.

A key advantage of embodiments of the invention is its various features that allow it to operate with very low power consumption over extended periods of time without sacrificing the quality of data collection. This is achieved through several design features, including the following:

The microcomputer 524 is a very low power design.

Several standard on-board sensors 508 (e.g., air and water quality sensors) are integrated into the DAP, sharing the same power supply, logger and radio.

In one embodiment, the DAP can be deployed with a battery charging solar panel.

The unit operates in two modes: a dynamic or active mode, and a sleep or low power mode. Most of the time, the unit is in sleep mode and no data is logged or transmitted. In this mode, all on-chip and off-chip peripherals use little or no current, and the current consumption of the DAP is approximately 300 microamps. Upon detection of a change in the sensor parameter beyond a configurable threshold, the DAP wakes up from sleep mode and switches into dynamic mode to perform data logging.

Wireless data reporting (i.e., transmitting to the cloud server) is performed periodically according to a user-configured schedule, e.g., periodically once every 5 minutes up to once per month. Alternatively, or in addition, wireless data reporting is performed intermittently, e.g., reporting is triggered when a predetermined amount of data has been logged or an alarm condition (e.g., low battery capacity) occurs.

Prior to wireless data transmission to the cloud server, sensor data is compressed to reduce the amount of time needed for transmission, reducing the time the cell module 528 needs to be powered on. Preferably, a run-length encoding (RLE) or other lossless compression algorithm is used.

If the communications protocol is disrupted during wireless transmission (e.g., due to connectivity issues such as maintenance on a cellular network tower), the unit makes several (e.g., at least three) re-connection attempts. If connection fails after re-connection attempts, the units switches into sleep mode until the next scheduled or triggered reporting time.

The DAP battery status and consumption information is reported to the cloud server when data is uploaded so that it can be monitored and trended by algorithms on the server. The server can send the DAP adjusted configuration parameters, such as measurement and reporting intervals, to manage the power consumption. For example, if the battery level is very low, scheduled reporting intervals can be made less frequent.

The battery status and consumption information is computed by the DAP as follows. There are two values which are of primary interest: average power consumption and maximum power consumption. Average power consumption is the sum of the total energy consumed by the system in Dynamic and Sleep Power modes, divided by the period of interest (i.e., one day, or one week).

Figure 8:
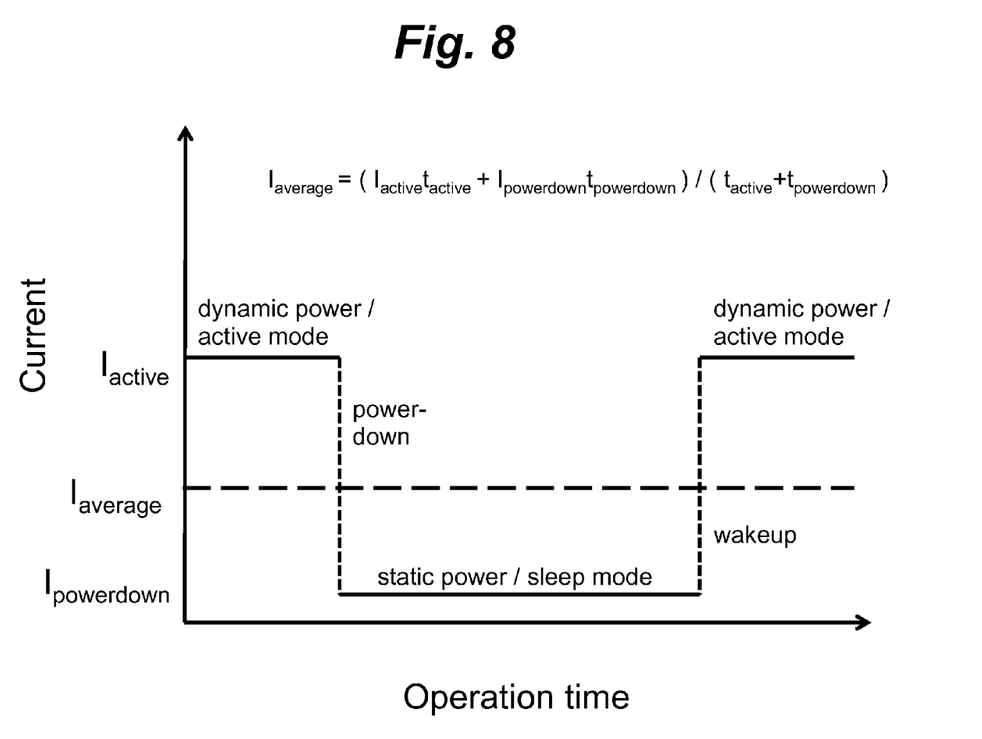
FIG. 8 is a graph of data acquisition platform current versus time, illustrating a smart power management technique, according to an embodiment of the invention.

As shown in FIG. 8, the dynamic power mode is when the remote unit is running at full power and at full speed, whereas the sleep power mode is when the remote unit is sleeping and waiting for a trigger, schedule, or alarm to wake it up. Average power is important because it provides a single value, which can be used to accurately determine battery life or the total energy use of the system.

Embodiments of the present invention conserve power by sampling values from one or more independent sensors at a comparatively high rate, e.g., eight times a second, with a practical unlimited range, while only logging the data if a change in one or more parameters being sampled exceeds a predetermined threshold. This thereby reduces power consumption and allows high resolution logging of usage events while running off of standard compact batteries for a targeted minimum of six months.

During sleep mode, the data acquisition platform (DAP) uses a comparator process that samples the sensor values at a configurable sampling interval, and the output is fed into a low-power microcomputer chip 524 (e.g., a Semiconductor Industries DS Pic available at Microchip.com). The comparator is implemented using a high resolution analog to digital converter that samples the sensor input value. The current sampled value is then compared with a recent sampled value. If the change in sampled sensor value remains below a configured threshold value and the sensor value remains within a configured normal range, then the unit continues in low-power sleep mode, without performing any data logging or reporting. Embodiments preferably use low noise non-biased signal processing and 16 bit or more dynamic range analog-to-digital signal conversion.

When the comparator firmware process detects a differential change in a sensor value exceeding a remotely programmable difference threshold for event triggering, the unit wakes up from sleep mode and activates the data logger. A timestamp, including the local date and time that the parameter change (relative to a programmable threshold) occurs is logged with the sensor value as stored data. Logging of the sensors measurement continues until the sensor value returns to a sensor baseline, which is a configurable threshold. The data logger is then deactivated and the unit returns to low-power sleep mode.

During data logging, the signed two-complement data from the analog to digital converter is coded and stored to SRAM memory as 32-bit compacted data sets to save SRAM memory 514. When reporting to the internal SD card memory 532 and the cloud computer using cell phone module 528, the data is separated from its compaction and reformatted along with time and date stamping just before transmission.

The stored events are coded by a data compression process (e.g., run-length encoding or other lossless encoding) to reduce the amount of data and, thereby, the amount of energy required for transmission.

The amount of sensor data can also be reduced using various other techniques. In one embodiment, instead of logging and reporting all the sensor data, the unit can analyze the data to determine if the event actually occurred (e.g., check if sensed values exceed a configurable threshold) and summarize the event's key characteristics (e.g., duration of the event, peak sensor value). More generally, the DAP analyzes the trigger events and sensor values and compares these to predetermined event characteristics. The DAP then logs the event rather than the complete set of all the sensor data. In this way, a large amount of sensor data can be reduced to just a few event markers, thereby saving both local storage requirement and telemetry transmission bandwidth.

Sensor data volume may also be reduced further using frequency domain adaptive filtering techniques. Events of interest often correspond with sensor data having very unique characteristics in both time and frequency. These characteristics can indicate the actual presence of the event with good fidelity. For example, in the case of water flow rate monitoring, spikes and drops in pressure may be detected by the DAP and used to indicate a usage event. Then, water flow is determined by minute differential pressures using simple durable transducers. If the system fails, the flow and use of water continues as before without any blockage or contamination.

Figure 7:
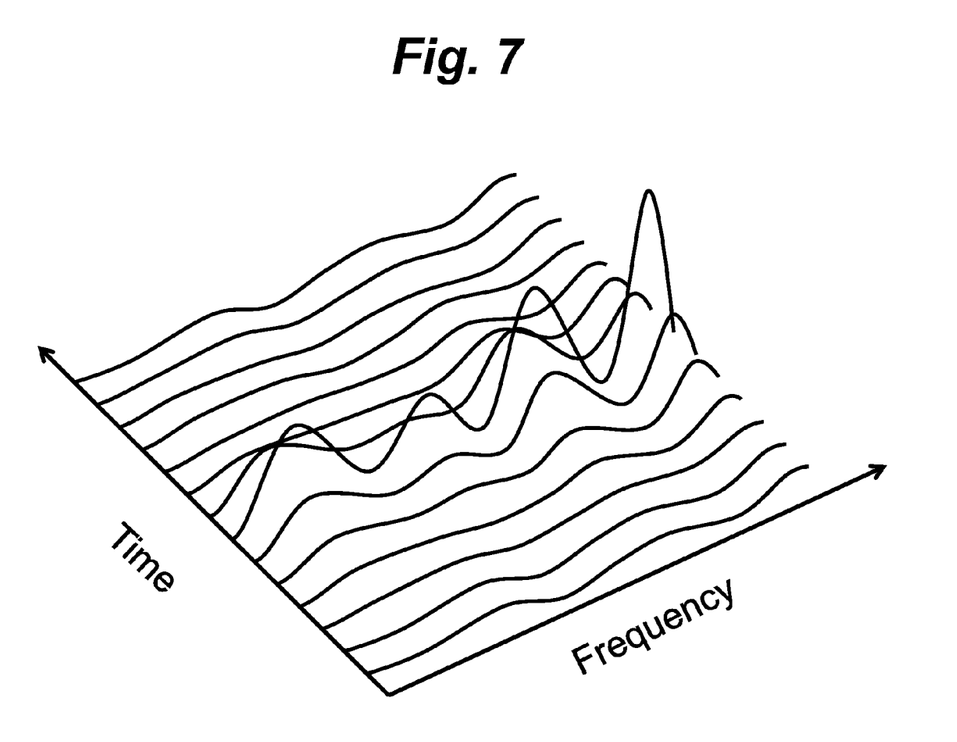
FIG. 7 is a graph of sensor signal amplitude graphed with respect to time and frequency, illustrating a frequency domain filtering technique, according to an embodiment of the invention.

FIG. 7 shows the Fourier transform of sampled water pressure for a period of time using two pressure transducers attached to a drinking water line. The peaks in the graph indicate how sharp the increase in pressure was over the observed time period. Because faster impulses of pressure will produce larger peaks, the peaks are indicative of the water flow being abruptly turned off, such as when a faucet knob was turned in the off direction. For example, the transducer comparator examines the reported water pressure data and waits for a trigger threshold, indicating a user opened a tap. When this sudden drop in water pressure is observed, the DAP starts logging the pressure readings until the sensed value returns to normal, indicating the user closed the tap. Closing the tap will cause a 'water hammer' effect, resulting in spiking pressure readings, as shown in the graph. Identification the these spikes indicates that pressure data logging is no longer required, and the DAP is then switched into low power sleep mode, without logging. Two pressure transducers, or a single differential pressure transducer, across an orifice or pipe diameter difference allows correlation of differential pressure readings to volumetric flow rate.

More generally, the unit can accurately and non-invasively detect usage events with known characteristics by performing numerical derivatives, low pass filtering, time averaging, and other signal processing techniques on the sensor data to identify signal peaks and other features of the data characteristic of predetermined properties of significant events of interest.

One or more times per day, the DAP relays logged data events directly to internet-based software programs via CDMA, GPRS, satellite, cellular networks, or Wi-Fi.

After the logged data is coded by the microcomputer to produce a data set, this data set (which may include event markers) is ready to be reported to the cloud server. The wireless connection to the server may use any of various wireless technologies including wireless Ethernet, Bluetooth, Wi-Fi, satellite, or cellular CDMA or GPRS. The connection to the server may also involve transmission over wired networks.

The data set is optionally buffered for transmission with up to thirteen other sensor data sets. A configurable transmission protocol is used to report the buffered sensor data sets at scheduled intervals which may be as infrequently as once every few days (e.g., every 7 days or every month), or as frequently as once every few minutes (e.g., every 5 minutes or every hour). In addition, the wireless reporting may be triggered by a programmable alarm threshold causing the DAP to transmit data immediately upon detection of alarm conditions.

In a cellular GPRS or CDMA implementation, the modem 528 acquires a cell tower channel and transmits the formatted sensor data sets for storage into an internet web-based database on a cloud-based server. Raw data measurements and system calculations are stored locally on the DAP. If the wireless network connection experiences any outages, buffered data stored on the DAP can be uploaded after the wireless network connection is re-established.

Internet protocols including encryption (e.g., the standard secure hash algorithm SHA-1) may be used to provide cloud computing compatibility and system data integrity. Currently most cloud computers and embedded microcomputers such as the one used in the DAP are capable of running the algorithm to generate a cryptographic key used with SHA-1.

During the data reporting sessions, the cloud server may provide the remote unit with configuration settings and other parameters. Preferably, during each data reporting session, the server (or other remote time server) provides the remote unit with current date and time information that the remote unit uses to update its internal clock for synchronization purposes. In one embodiment, the DAP relays to the remote unit during the wireless reporting sessions calibration files, control conditions, difference thresholds for event triggering, data sampling intervals, sensor baseline values, sensor calibration values, alarm settings, reporting schedule intervals, comparator threshold trip points, system reaction parameters, and onsite firmware. These parameters may represent information that has been updated automatically by cloud server processing or updated manually by an operator 120 connected to the server 110, e.g., via a web interface 116.

For example, if a particular remote unit exhibits infrequent use at certain times of the day or week, that DAP can reduce its data logging and/or reporting during those times to save battery power. This can be accomplished through reduced sampling and/or reporting rates. If the cloud server is informed that a building where a sensor unit is installed will be unoccupied, the server can send the unit updated configuration setting that will hold the unit in sleep mode until the occupants return.

The cloud server may also transmit to the remote unit device control parameters for issuing commands to remotely control devices connected to the sensor. This capability allows the server to remotely control devices to perform simple tasks like opening a valve, controlling a pump, or alerting occupants to problems. For example, the cloud server may provide to the DAP with device control parameters that are interpreted based on sensor type, identification, schedule and/or threshold by the DAP to send a control signal (e.g., turn on or turn off) to actuators such as alarms, valves, or lights based on a schedule and/or triggered events. These and other downlink signals to the DAP are preferably also compressed in a similar manner as the uplink signals.

In other embodiments, the cloud server may also transmit to the remote units programs, or parts of programs, which the remote units then execute. The results of the execution are then returned to the cloud server at a later reporting time. Consequently, the distributed sensor system can perform distributed processing and resource sharing. Although the computing power of each remote unit is limited, as the number of remote units in a distributed sensor system becomes very large, the system as a whole gains significant computing resources which can be operated in parallel. For example, each remote unit can perform a small piece of computation, such as minimum, maximum and average values in addition to other mathematical formulas such as image or signal processing or electronic noise reduction. Many algorithms in signal and data processing are separable, i.e., they can be solved by dividing the algorithm into small identical constructs that can be computed separately from all the other identical constructs. These identical constructs can be computed in parallel by the remote units and then the results combined by the cloud server to form the complete solution. A good example of this is the Fourier transform algorithm which is used frequently to transform time measurements into their respective frequency representation. Once it is represented in the frequency domain, powerful filtering techniques become easily performed. The Fourier transform algorithm is made of several identical constructs. Since each remote unit has its own hardware and firmware resources, each one could be used to do one of the needed computational constructs and report its results to the cloud where they are combined to form the complete solution.

The application code stored in the cloud-based server for powerful distributed processing can be developed and downloaded automatically to each remote sensor unit for real-time use or for use at a later time. Each remote unit can get the code from the cloud-based program just after the unit has reported the stored data to the cloud server program. Process hungry applications like signal and image pattern recognition can make use of the distributed sensor system's large computer resources for data analysis and system optimization.

As server applications evolve, this growing distributed compute resource combined with our dynamically scalable cloud computing resources allows the system to address even the most demanding signal processing and data aggregation needs.

Although immediate, low-level data processing is performed locally on each remote unit (e.g., averaging, sensing trigger events, logging, calculating offsets and gains, data compression), higher level processing algorithms for summary statistics and alarm events are preferably performed on the cloud server, allowing high performance while keeping remote unit power consumption at a minimum. The cloud server also integrates data from the entire collection of remote units, providing comprehensive summaries, analysis, and status of the sensor network.

At the cloud server 402, data from each of the remote units in the system is received, decompressed, stored in a database 406, processed, and analyzed by programs executed on the server or other machines connected to the server.

After upload from the remote units, the data file is stored based on a unique DAP ID associated with the reporting remote unit. Timestamps and data type are then identified and parsed. Signal processing algorithms 412 may be applied to perform various types of data analysis. For example, with water filter data, pressure readings are offset and normalized to the maximum and minimum values. A numerical derivative is calculated for each sensor where a numerical low-pass filter is applied to the derivative. Filtered derivative peaks and local preceding minima are identified. Volume difference can then be calculated with the average minimum offset. Laboratory based and structured observation data sets can then be mapped against sensor detected events and volumes. The results of these computations can then be stored in a database 414. For example, aggregated data analysis by the cloud server of data collected and analyzed over time may include correlation templates such as air or water quality signatures indicating pollution or other changes in chemical constitution that are updated and used to identify sensor data characteristics of events corresponding to environmental biohazards and their byproducts such as toxic carbon monoxide levels or salt contaminated drinking water.

In one embodiment, the sampled data is transformed into the frequency domain to identify distinctive patterns. These patterns are compared to a pre-stored library of patterns, and a determination is made whether the measured pattern matches a stored pattern. Convolution may be used to compare these patterns and once the data is in the frequency domain, convolution is performed with a simple multiply. Such a library of patterns can rapidly be compared to data being measured and reported by the DAP to quickly identify potential anomalies of concern and report potential problems to the appropriate authority. The signal signatures reported by the DAP may be analyzed by the internet database at high speed, to allow quicker response.

Data can be analyzed by the cloud server to facilitate insight into programmatic, social, economic, and seasonal changes that may influence the quality of the system. Additionally, occupant behavioral patterns such as how and when a device is being used can be analyzed by integrating the behaviors into the design and modification of the system. This may include user behaviors with water, air and energy provisioning systems, integration of weather data and in-person interviews to better evaluate performance of environmental health technologies. For example, each installed distributed sensor system design may be validated in at least two ways: laboratory and field trials. In laboratory testing, measured or known values of the target parameter (e.g., water volume, rate, or gas concentration) are introduced to the DAP. The software algorithm is tuned to these known quantities, and then this algorithm is processed identically for the field validation and field deployments. Field validation is performed using structured observations where a household or community who verbally consents to having a monitored device and observers in their home/community is studied for one day. The duration of the observation (hours) depends on the application to acquire enough data to compare structured observations to sensor data.

Figure 6:
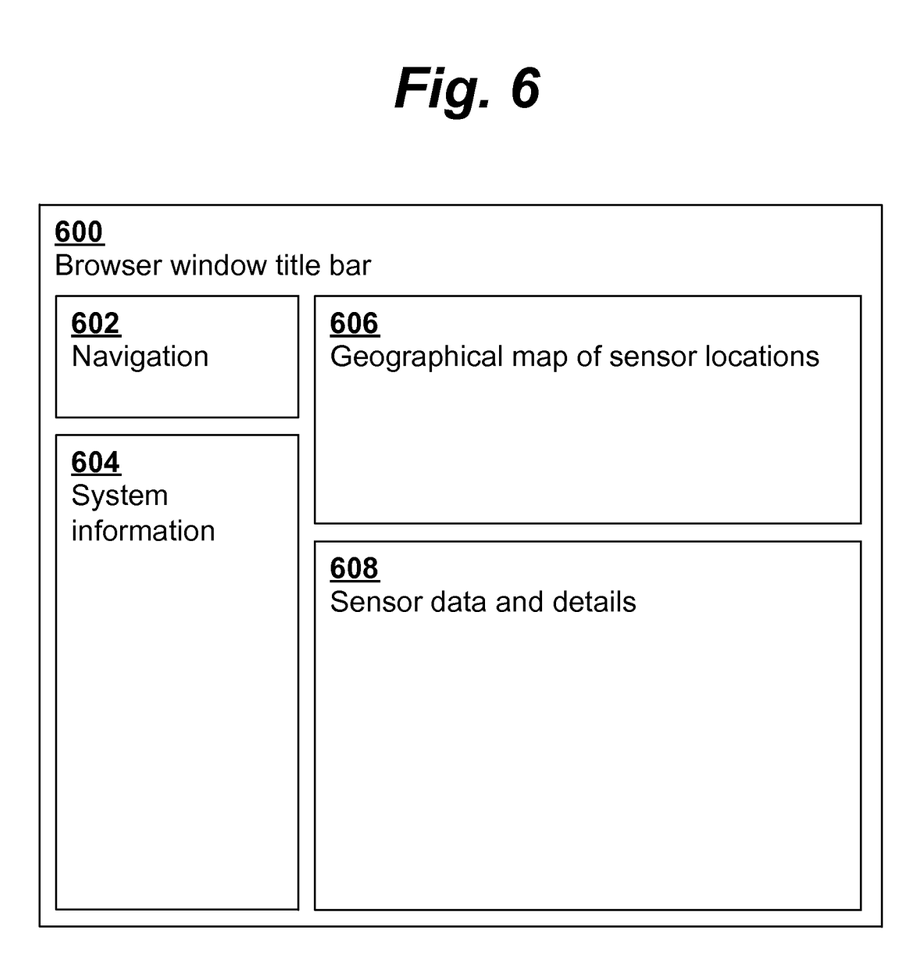
FIG. 6 is an illustration of a user interface to a cloud-based program platform, according to an embodiment of the invention.

The consolidated and analyzed data at the cloud server is preferably made accessible to authorized users via a web server that produces a web interface that connects to any standard internet browser. FIG. 6 illustrates an example of a web interface window 600 displayed to a user including components for navigation 602, overall system information summary 604, a geographical map of remote sensor unit locations 606, and detailed sensor information, status, and data 608. Such a web-enabled data sharing platform allows continuous review and analysis of the collected data by customers, from anywhere in the world. It also allows system operators to update configuration parameters and initiate commands to control the operation of devices connected to the remote units, e.g., in response to alarm conditions. Users may examine data for individual sensors, view alarm conditions, update sensor unit parameters, as well as download and export data for import and integration into other data analysis programs.

In conclusion, embodiments of the present invention provide an advanced remote monitoring system that can provide solutions to many of the issues related to sustainability of water, energy and infrastructure interventions. Near real-time data can be inexpensively logged and analyzed to optimize the performance of the particular intervention.

The invention claimed is:

1. A method implemented by a remote data acquisition platform in a distributed wireless monitoring system, the method comprising:

receiving over a wireless internet link from a cloud server a difference threshold for event triggering, a sampling interval, a sensor baseline value, a reporting schedule, sensor calibration information, and current time and date information;

sampling by comparators at the sampling interval a sensor value;

activating a data logger if the comparators sense a differential change in the sensor value exceeding the difference threshold for event triggering;

logging the sensor value together with a timestamp as stored data while the data logger is activated;

deactivating the data logger and entering a sleep mode if the sensor value returns to the sensor baseline;

compression encoding the stored data;

periodically transmitting during wireless reporting sessions the compression encoded stored data over the wireless internet link to the cloud server according to the reporting schedule, and receiving during the wireless reporting sessions adjusted configuration parameters from the cloud server, wherein the adjusted configuration parameters comprise difference thresholds for event triggering, data sampling intervals, sensor baseline values, sensor calibration values, reporting schedule intervals, and comparator threshold trip points;

receiving over the wireless internet link from the cloud server a device control parameter;

sending a control signal to a device actuator based on the received device control parameter.

2. The method of claim 1 wherein transmitting the compression encoded stored data over the wireless internet link to the cloud server comprises transmitting the compression encoded stored data if a predetermined threshold of data has been logged.

3. The method of claim 1 further comprising transmitting to the cloud server over the wireless internet link an alarm if a low battery capacity state is detected, if a sensor value exceeds a predefined threshold, or if a predefined comparator difference is exceeded.

4. The method of claim 1 further comprising deactivating the data logger and entering a sleep mode if communications over the wireless internet link to the cloud server is disrupted and more than three connection attempts fail.

5. The method of claim 1 further comprising dynamically downloading over the wireless internet link from the cloud server application code, executing the application code, and uploading over the wireless internet link to the cloud server results of the executing, wherein the application code is a component of a separable program for distributed processing.

6. The method of claim 1 further comprising performing data analysis of sensor values prior to data being transmitted to the cloud server.

7. The method of claim 1 further comprising performing signal processing of sensor values prior to logging sensor values, wherein the signal processing is selected from the group consisting of performing numerical derivatives, low pass filtering, frequency domain adaptive filtering, and time averaging.

8. The method of claim 1 further comprising simultaneously sampling and logging multiple sensor values representative of multiple distinct physical parameters selected from the group consisting of weather, air quality, water level, water flow, water quality, fluid pressure, vibration, image, electric current, solar irradiance, soil moisture.

* * * * *